United States Patent
Christiansen et al.

(10) Patent No.: US 11,323,783 B2
(45) Date of Patent: May 3, 2022

(54) CONSUMPTION METER AND REMOTE READING METHOD IN A UTILITY NETWORK WITH LINK MANAGEMENT

(71) Applicant: Kamstrup A/S, Skanderborg (DK)

(72) Inventors: Johnny Dørken Christiansen, Galten (DK); Flemming Hald, Hadsten (DK)

(73) Assignee: Kamstrup A/S, Skanderborg (DK)

( * ) Notice: Subject to any disclaimer, the term of this patent is extended or adjusted under 35 U.S.C. 154(b) by 0 days.

(21) Appl. No.: 16/474,623

(22) PCT Filed: Dec. 22, 2017

(86) PCT No.: PCT/EP2017/084340
§ 371 (c)(1),
(2) Date: Jun. 28, 2019

(87) PCT Pub. No.: WO2018/122158
PCT Pub. Date: Jul. 5, 2018

(65) Prior Publication Data
US 2019/0342639 A1  Nov. 7, 2019

(30) Foreign Application Priority Data
Dec. 30, 2016  (EP) .................................... 16207479

(51) Int. Cl.
*H04L 1/00* (2006.01)
*H04L 1/18* (2006.01)
(Continued)

(52) U.S. Cl.
CPC .......... *H04Q 9/00* (2013.01); *H04Q 2209/60* (2013.01)

(58) Field of Classification Search
None
See application file for complete search history.

(56) References Cited

U.S. PATENT DOCUMENTS 7,477,627 B2 *  1/2009  Ginzburg .............. H04L 1/0002
                                                    370/333
7,949,433 B2 *  5/2011  Hern .................... A01G 25/167
                                                    700/284
(Continued)

FOREIGN PATENT DOCUMENTS

JP        2005277507     * 10/2005

OTHER PUBLICATIONS

International Search Report and Written Opinion of corresponding International Patent Application PCT/EP2017/084340 dated Mar. 28, 2018.

*Primary Examiner* — Curtis A Kuntz
*Assistant Examiner* — Jerold B Murphy
(74) *Attorney, Agent, or Firm* — Renner, Otto, Boisselle & Sklar, LLP

(57) ABSTRACT

A consumption meter (M1) arranged to determine a consumed quantity of a utility at the consumer site. The meter (M1) has a communication unit with a transmitter and a receiver arranged for communication via a network, preferably an RF network. The meter can autonomously transmit data frames (DF) in accordance with a set of transmission parameters, e.g. data frames with data indicative of a consumed quantity. The meter can receive, within a limited time window (TW) following transmission of said data frame (DF), an acknowledgement frame comprising link data indicative of receipt of said data frame by an associated collector which has received the data frame (DF). Finally, the meter can adjust the set of transmission parameters for transmission of a subsequent data frame (DF) in response to said link data.

20 Claims, 2 Drawing Sheets

(51) Int. Cl.
*H04W 52/04* (2009.01)
*H04Q 9/00* (2006.01)

(56) References Cited

U.S. PATENT DOCUMENTS

| | | | | |
|---|---|---|---|---|
| 8,379,535 | B2* | 2/2013 | Chen | H04L 65/80 |
| | | | | 370/252 |
| 9,400,192 | B1* | 7/2016 | Salser, Jr. | G01D 4/002 |
| 9,801,137 | B2* | 10/2017 | Ree | H04W 52/0229 |
| 10,305,639 | B2* | 5/2019 | Baldemair | H04L 1/1825 |
| 2002/0111183 | A1* | 8/2002 | Lundby | H04W 52/325 |
| | | | | 455/522 |
| 2003/0021243 | A1* | 1/2003 | Hamalainen | H04L 1/0015 |
| | | | | 370/329 |
| 2005/0239491 | A1* | 10/2005 | Feder | H04W 52/08 |
| | | | | 455/522 |
| 2009/0102681 | A1* | 4/2009 | Brennan, Jr. | G01D 4/004 |
| | | | | 340/870.03 |
| 2010/0142448 | A1* | 6/2010 | Schlicht | H04W 28/021 |
| | | | | 370/328 |
| 2014/0161114 | A1* | 6/2014 | Shuey | G06Q 50/06 |
| | | | | 370/350 |
| 2014/0184424 | A1* | 7/2014 | Makgill, Jr. | H04Q 9/00 |
| | | | | 340/870.39 |
| 2018/0183489 | A1* | 6/2018 | Rasmussen | H04B 1/7101 |

* cited by examiner

CONSUMPTION METER AND REMOTE READING METHOD IN A UTILITY NETWORK WITH LINK MANAGEMENT

This application is a national phase of International Application No. PCT/EP2017/084340 filed Dec. 22, 2017 and published in the English language, which is an International Application of and claims benefit of priority to Patent Application No. EP 16207479.3, filed on Dec. 30, 2016. The disclosures of the above-referenced applications are hereby expressly incorporated by reference in their entireties.

FIELD OF THE INVENTION

The present invention relates to the field of consumption or utility networks or AMI networks. More specifically to systems for remote reading of utility meters in a fixed connection less network, e.g. a water, heat, cooling, or gas remote reading network.

BACKGROUND OF THE INVENTION

Utility or consumption meters are often set up in a fixed network where each meter has a communication unit arranged to transmit meter data to a number of collectors, also referred to as concentrators or aggregators, which are receiver units arranged to collect data from a plurality of meters and communicate these data to a back-end server. In such Advanced Metering Infrastructure (AMI), a link management function that adjusts communication parameters in order to minimize network congestion and metering point energy consumption is preferred to create a bandwidth efficient AMI.

Energy consumption of the communication unit in the consumption meter is important, since the meters are often battery powered and expected to operate for a long time without any need for maintenance. Minimizing congestion is important in areas with a high concentration of meters and collectors, thereby preventing collectors from receiving data from meters outside its primary zone of coverage. Especially, this is problem in a network using a connection less communication protocol, where meter data is transferred without any preceding negotiation of communication parameters.

Using a connection less communication protocol, meter data transfer is done without any preceding negotiation of communication parameters such as transmission power, data rate, coding rate, channel, spreading factor etc. In such connection less communication, it would be advantageous to have a link management to control the communication parameters based on meta data from the connection less communication in the system.

A connection less communication protocol does not require any specific information other than a unique identification for a consumption meter to be added to the AMI. However, in connection less communication, congestion and battery life-time may be seen as problems, in case such connection less based network is to work efficiently for battery powered consumption meters.

SUMMARY OF THE INVENTION

Following the above, it would be advantageous to provide a consumption meter and a method for effective reading of utility meter data in a connection less AMI, i.e. in a network without any preceding negotiation of communication parameters between a consumption meter and a collector. Especially, the consumption meter and method are preferably energy saving and yet provide a reliable reading also in cases where consumption meters are mounted in an area at a high density.

In a first aspect, the invention provides a consumption meter arranged to determine a consumed quantity of a utility at the consumer site, comprising a communication unit comprising a transmitter and a receiver arranged for communication via a network, and being arranged
- to autonomously transmit data frames in accordance with a set of transmission parameters,
- to receive, within a limited time window following transmission of said data frame, an acknowledgement frame comprising link data indicative of receipt of said data frame by an associated collector, and
- to adjust the set of transmission parameters for transmission of a subsequent data frame in response to said link data.

Such consumption meter is advantageous, since it allows effective automatic reading of utility meter data e.g. in a connection less AMI with fixed locations of collectors to receive data frames from the meter. Via link data, e.g. indicative of an observed link margin at an associated collector, or link data informing the meter about a new set of transmission parameters, the consumption meter has the possibility to either adjust its transmission properties to increase or decrease the link margin for transmission of the subsequent data frame. E.g. the link data may specify a predetermined set of adjustable transmission parameters so as to either increase or decrease the link margin, e.g. an adjustable transmission power and/or data coding rate. The advantage with such communication scheme is that energy can be saved for transmission of data frames in the consumption meter, since the set of transmission parameters can be set so as to comply with e.g. with a preset link margin. I.e. transmission parameters can be trimmed to comply with an acceptable minimum link margin for reliable transmission, but at the same time, e.g. transmission power can be reduced to a minimum for obtaining the required link margin, thereby saving electric energy in the consumption meter.

Further, the fact that the link margin can be minimized also helps to prevent data congestion in a connection less AMI, which may be a problem e.g. in urban areas with a high density of consumption meters. Due to the possibility of adjusting the transmission parameters to obtain a desired minimum link margin, it can be ensured that each consumption meter does not transmit at such high power or other transmission parameters that it may disturb communication of an unnecessary number of nearby collectors. Thus, the consumption meter according to the first aspect will help to reduce problems with congestion.

Still further, the consumption meter is advantageous, since the dynamically adjustable transmission parameters allows reliable transmission of data also in cases where the path loss in the transmission changes over time, e.g. when large objects such as new buildings etc. affect the transmission path between the consumption meter and the nearest collector. The consumption meter can compensate for this by adjusting transmission parameters in response to the received link data.

By 'autonomously transmit data frames' is understood that the consumption meter determines the time to transmit a data frame without any time synchronization in the network. E.g. the consumption meter transmits a data frame with a predetermined time interval, or at randomly selected time intervals. Especially, the consumption meter may transmit one data frame comprising data indicative of a consumed quantity of the utility every 1-12 hours, e.g. every 3 hours. Data frames transmitted by the consumption meter may comprise consumed quantity data and/or other data.

In the following, preferred features and embodiments will be described.

The communication unit may further be arranged to adjust the set of transmission parameters according to a fall back algorithm, in case no acknowledge frame is received within said limited time window. This allows a further possibility to adjust the transmission properties of the meter in an intelligent manner, especially to adjust the set of transmission parameters to increase link margin in the transmission of subsequent data frames, in absence of any received acknowledge frame in response to transmission of a data frame, if it is assumed that the last data frame was lost due to the set of transmission parameter resulting in a too low link margin at the receiving collector. Especially, the communication unit may be arranged to adjust the set of transmission parameters with respect to one or more of: transmission power, data rate, coding rate, transmission channel, and transmission spreading factor, according to the fall back algorithm. Preferably, the communication unit is arranged to count a number of consecutive missing acknowledge frames N in response to transmission of consecutive data frames, and wherein the fall back algorithm determines an adjusted set of transmission parameters in response thereto. This is advantageous, since it may be preferable to avoid adjusting transmission parameters (increase link margin) in response in absence of only one single acknowledge frame, since this frame could be missing due to a failed receipt of the acknowledge frame due to a collision, rather than due to a poor link margin in an associated collector. Therefore, instead of just increasing link margin, it may be preferred that the communication unit is arranged to adjust the set of transmission parameters in accordance with the second algorithm, so as to increase a link margin in transmission of data frames comprising data indicative of the consumed quantity, if it is determined that the number of consecutive missing acknowledge frames N exceeds a predetermined threshold value. Especially, such predetermined threshold value may be such as 2-10, such as 3-8, such as 4-6, e.g. 5.

In one embodiment the fall back algorithm increases the link margin gradually in a number of steps, each step including adjusting either one or both of the transmission parameters; transmission power and coding rate. Link margin is here to be understood as the link margin between the meter and the collector. Increasing link margin gradually is advantageous when the fall back algorithm compensates for minor changes in the surroundings of the meter. Each step may increase the link margin by different amounts. The fall back algorithm may increase the link margin gradually by small initial increases while the following steps may increase the link margin substantially. Increasing link margin gradually has the advantage that a change in path loss due to changes in the surroundings of the collector does not cause a rapid increase in link margin by all meters, which would cause unnecessary increase of congestion in the network.

The communication unit may be arranged to adjust the set of transmission parameters with respect to one or more of: transmission power, data rate, coding rate, transmission channel, and transmission spreading factor, in response to the link data. Especially, it may be preferred to adjust transmission power, preferably to decrease or increase transmission power so as to meet a predetermined link margin which can be communicated to the consumption meter from an associated collector in the link data. Especially, the associated collector may in the link data indicate an adjusted set of transmission parameters to be used by the communication unit in the consumption meter for transmission of a subsequent data frame. Alternatively, the consumption meter may be arranged to adjust the set of transmission parameters in accordance with an adjustment algorithm in response to the link data. With such adjustment algorithm in the consumption meter, the link data may comprise a measure of link margin determined by an associated collector, and wherein the adjustment algorithm determines an adjusted set of transmission parameter, so as to obtain a lower link margin in transmission of a subsequent data frame, in case a value of the measure of link margin is above a predetermined threshold value. If the measure of link margin is below a predetermined threshold value, the adjustment algorithm may be arranged to adjust the transmission parameter, so as to obtain a higher link margin in transmission of a subsequent data frame.

The communication unit may be arranged to determine a measure of link margin for receipt of the acknowledge frame, and to transmit link data indicative of said measure of link margin. This allows an associated collector to adjust its transmission parameters, e.g. transmission power, to obtain an acceptable meter to collector link margin. This can help to reduce congestion problems, since a minimum transmission power and/or data rate or coding can be used in the transmission of acknowledge frames to the meter. Especially, the communication unit may be arranged to transmit said link data piggybacked onto a data frame comprising data indicative of the consumed quantity of the utility, thereby allowing such extra data to be sent with a minimum of required extra network capacity.

The data frame may comprise data indicative of the consumed quantity of the utility. However, data frames may be transmitted which contain other data than consumed quantity data. Especially, the consumption meter may be arranged to transmit a data frame comprising data indicative of the consumed quantity of the utility at a predetermined time interval, e.g. to transmit a data frame with updated consumed quantity data every 1-12 hours, such as every 3 hours. The communication unit is preferably arranged to transmit a data frame at a predetermined interval of such as an interval selected between 1 minute to 24 hours, such as an interval selected between 30 minutes and 12 hours, such as an interval selected between 1 hour and 6 hours, such as an interval selected between 2 hours and 4 hours.

The link data may include data indicative of a link margin determined by an associated collector which receives the data frame, or at least the link data may indicated to the consumption meter whether to adjust the transmission parameters to maintain, to increase, or to decrease a link margin in subsequent data frame transmissions. Specifically, the communication unit may be arranged to adjust the set of transmission parameters in accordance with the first algorithm, so as to increase a link margin in transmission of data frames comprising data indicative of the consumed quantity, in case the link margin is below a predetermined threshold value. Specifically, the communication unit may be arranged to adjust the set of transmission parameters in accordance with the first algorithm, so as to decrease a link margin in transmission of data frames comprising data indicative of the consumed quantity, in case the link margin is above a predetermined threshold value.

In some embodiments, the communication unit is arranged to determine a measure of link margin for receipt of the acknowledge frame, and to transmit link data in response to the measure of link margin. This provides the possibility to let the associated collector adjust transmission parameters when transmitting an acknowledge frame to the specific consumption meter, thereby allowing the collector to transmit with a link margin which is acceptable, and yet not with transmission parameters which may disturb further communication in the network, thereby helping to reduce network congestion problems.

It is to be understood that the communication unit may be a unit separate from the measurement part of the consumption meter, or the communication unit may be an integrated part of the consumption meter, e.g. sharing a processor with other functions in the consumption meter. The communication unit may be arranged within a casing housing the parts of the consumption meter arranged to determine the consumed quantity of the utility. However, alternatively, the communication unit may be arranged in a separate casing and connected to a measurement unit of the consumption meter by a wired or wireless link.

The communication unit is preferably arranged to transmit the data frame by means of a wireless Radio Frequency (RF) signal, and to also receive acknowledge frames by means of a wireless RF signal. Especially, the communication unit may be arranged to transmit the data frame at a first RF carrier frequency, whereas the communication unit is arranged to receive the acknowledge frame at a second RF carrier frequency different from the first RF carrier frequency.

The consumption meter may comprises one or more ultrasonic transducers arranged for transmitting and receiving ultrasonic signals in fluid flowing through a measuring tube, and wherein a measurement circuit connected to the one or more ultrasonic transducers is arranged to generate data indicative of flow rate of the fluid flowing through the measuring tube accordingly. Preferably the communication unit is then arranged to transmit a data frame comprising data indicative of a flow rate.

The consumption meter may be one of: a water supply meter, a district heating meter, a district cooling meter, and a gas supply meter.

The communication unit is preferably arranged to transmit a unique identification code for the consumption meter along with the data frame indicative of the consumed quantity, e.g. the unique identification code may be comprised in said data frame.

The communication unit may be arranged to encrypt the data indicative of the consumed quantity in accordance with an encryption key, such as a time limited encryption key.

The consumption meter and its communication unit is preferably battery powered.

In a second aspect, the invention provides a collector comprising a communication unit comprising a transmitter and a receiver arranged for communication via a network, and being arranged
  to receive data frames comprising data indicative of a consumed quantity from a plurality of consumption meters,
  to determine a measure of link margin, for receipt of a data frame from a consumption meter, and
  to transmit an acknowledgement frame to the consumption meter comprising link data in response to the measure of link margin.

The collector may determine an adjusted set of transmission parameters for the associated consumption meter in response to the measure of link margin, and to include such adjusted set of transmission parameters in the link data for use in a subsequent transmission of a data frame. Alternatively, or additionally, the link data may comprise a value indicative of the measure of link margin, which may then interpreted in the consumption meter to adjust its set of transmission parameters accordingly.

Especially, the collector may further be arranged to receive link data from a consumption meter, and to adjust at least one parameter related to transmission of acknowledgement frames to said consumption meter accordingly.

In a third aspect, the invention provides a system for remote reading of a plurality of consumption meters via a connection less network, the system comprising:
  a plurality of consumption meters according to the first aspect, and
  a plurality of collectors according to the second aspect, arranged at respective locations. The system may further comprise a computer arranged for communication with the plurality of collectors, in a wired or wireless connection, and being arranged to receive data indicative of the consumed quantity from said plurality of consumption meters collected by the plurality of collectors.

In a fourth aspect the invention provides
A method for remote reading of a consumption meter via a network, the method comprising
  1) transmitting from the consumption meter a data frame comprising data indicative of a consumed quantity of a utility in accordance with a set of transmission parameters,
  2) receiving at a collector the data frame comprising data indicative of the consumed quantity of the utility,
  3) determining by the collector a measure of link margin for receipt of said data frame, and
  4) transmitting from the collector to the consumption meter an acknowledgement frame comprising link data in response to the measure of link margin,
  5) receiving at the consumption meter, within a limited time window, the acknowledgement frame comprising link data, and
  6) adjusting at the consumption meter, the set of transmission parameters for transmission of a subsequent data frame in response to said link data.

In a fifth aspect, the invention provides a computer executable program code arranged to perform the steps of the method according to the fourth aspect, when executed partly on a processor in a consumption meter and partly on a processor in a collector. Especially, a first executable program code part may be arranged to perform the steps 1), 5) and 6) when executed on a processor in the consumption meter, and a second executable program code part may be arranged to perform the steps 2), 3) and 4), when executed on a processor in the collector. Especially, the computer executable program code may be stored on a tangible storage medium or stored in a memory accessible by the processor(s).

Yet another aspect of the invention provides a consumption meter arranged to determine a consumed quantity of a utility at the consumer site, comprising a communication unit comprising a transmitter and a receiver arranged for communication via a network, and being arranged—to autonomously transmit data frames in accordance with a set of transmission parameters—indicate in the transmitted data frame one or more of the communication parameters used for the transmission of said data frame—to receive, within a limited time window following transmission of said data frame, an acknowledgement frame comprising link data indicative of receipt of said data frame by an associated collector, and—to adjust the set of transmission parameters for transmission of a subsequent data frame in response to said link data. The communication unit may further be arranged to adjust the set of transmission parameters according to a fall back algorithm, in case no acknowledge frame is received within said limited time window. In this aspect of the invention, the consumption meter indicates to the collector one or more of the transmission parameters used for the transmission of the data frame by including them in the transmitted frame. Such transmission parameters may be the transmission power used for the transmission. This has the advantage the collector is enabled to adjust the link margin for data frames transmitted from the collector to the meter based on information obtained from data frames transmitted from the meter to the collector. The collector uses the link data, including the transmission power, in the data frame sent from the meter to calculate the path loss between the meter and the collector. Based on the calculated path loss the collector adjusts the transmission power to be used when transmitting a data frame form the collector to the meter.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
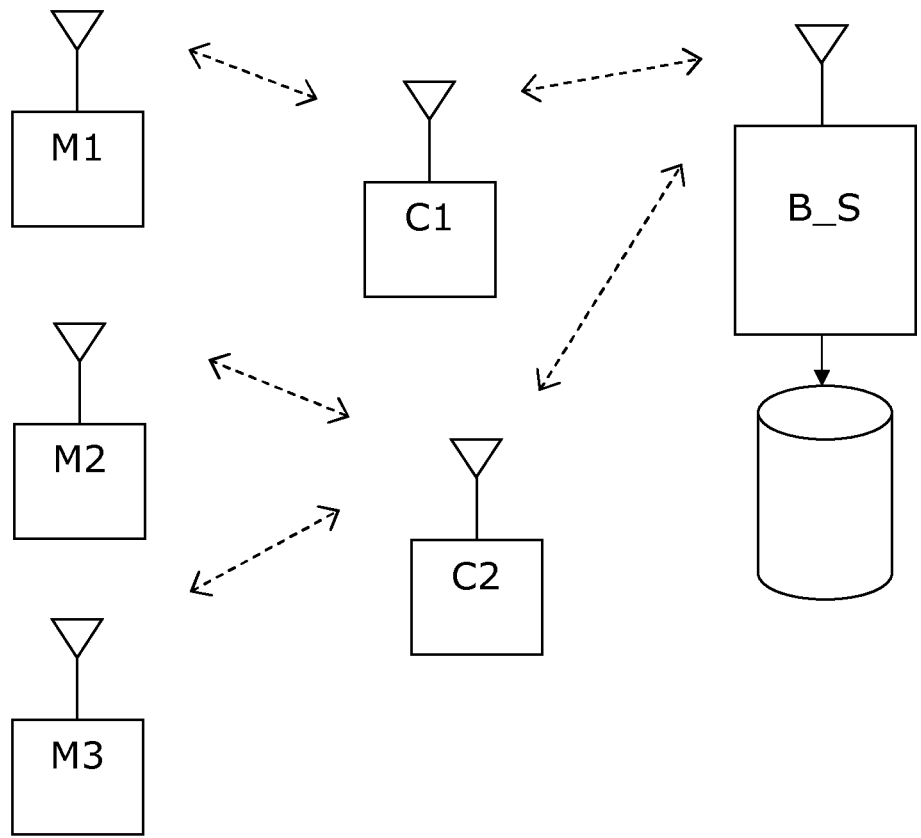
FIG. 1 illustrates a block diagram of a AMI meter reading system embodiment.

FIG. 1 illustrates basic elements of an AMI meter reading system embodiment. The system comprises battery powered consumption meters M1, M2, M3, e.g. water or heating meters, mounted at utility installations at respective consumer sites. The meters M1, M2, M3 are arranged for 2-way wireless RF communication with collectors C1, C2, which are communication devices arranged at fixed locations to collect data from meters M1, M2, M3 located in a given area. The collectors C1, C2 are arranged to transmit, here illustrates as a wireless transmission, to a backend server B_S which may store and/or further process the received data indicative of consumed quantity from the consumption meters M1, M2, M3. Preferably, the meter data transmitted from the consumption meters M1, M2, M3 are encrypted by a time limited encryption key, which ensures that data collected by the collectors C1, C2 are encrypted, and that the encryption key is stored only at the backend server B_S which can then decrypt the data frames to arrive at the consumed quantity data.

The communication between meters M1, M2, M3 and collectors C1, C2 can be connection less, and based on a scheme where each meter transmits a data frame with data indicative of the consumed quantity, where a data frame is transmitted with a fixed time interval, e.g. one data frame every 3 hours, and where collector(s) C1, C2 receiving the data frame transmits an acknowledge frame to the meter in return. The meter listens for this acknowledge frame in a short time window following the transmission of the data frame. If the meter does not receive any acknowledge frame, this can either be due to: 1) a network collision in the data frame transmission, 2) the data frame is transmitted from the meter at a too low link margin for receipt of the nearest collector, or 3) a collector has received the data frame and transmitted an acknowledge frame which is then lost due to either network collision or due to transmission with a too low link margin for successful receipt at the meter.

According to the invention, the meters M1, M2, M3 transmits the data frames in accordance with a set of transmission parameters which can be adjusted according to link data received from the collector C1, C2 having received the data frame. Preferably, the collector C1, C2 transmits in the link data one or more values indicative of an adjusted set of transmission parameters which is based on a determined link margin for receipt of the data frame, e.g. so as to meet a predetermined target link margin. Thereby the meter M1, M2, M3 having transmitted the data frame can simply adjust its transmission parameters accordingly, thereby adapting its transmission properties to provide a lower, or a higher link margin in a transmission of a subsequent data frame.

The meter M1, M2, M3 may also itself run an adjustment algorithm which serves to calculate an adjusted set of transmission parameters in response to e.g. a value indicative of a link margin received in the link data. E.g. such adjustment algorithm may specify a target link margin, for example a link margin value of 3-12 dB, e.g. 6 dB, may be the target. This allows a reliable data frame transmission which can be dynamically adapted to changes in the transmission path between meter and collector, e.g. a large vehicle may be parked in the transmission path, thereby lowering the link margin.

Irrespective of whether the adjustment algorithm is executed by the collector C1, C2 or by the meter M1, M2, M3, an adjustment in the subsequent data frame transmission may include adjusting one or more transmission parameters, e.g. transmission power, coding rate, spreading factor, transmission channel, and data rate. If the transmission path is good, the link margin may be high, and the meter M1, M2, M3 can e.g. reduce transmission power, thereby saving battery and at the same time reduce the risk of data collision in the network. Otherwise, if the first algorithm can be designed such that the meter M1, M2, M3 selects to increase link margin, e.g. by adjusting one or more transmission parameters, e.g. stepwise over the next two or more data frame transmissions.

Figure 2:
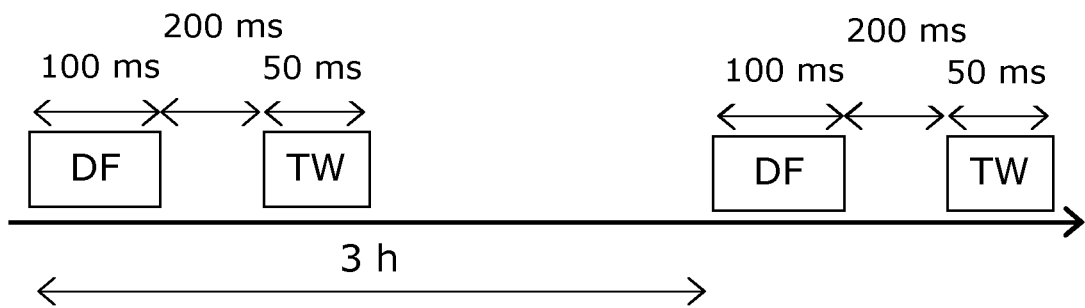
FIG. 2 illustrates possible timing of data frame transmission from a consumption meter and time window for receipt of an acknowledgement frame from an associated collector.

FIG. 2 illustrates an example of the an autonomous transmission scheme for transmission of a data frame DF with data indicative of a consumed quantity from a consumption meter, where the meter selects the timing of transmission of data frames as a fixed predetermined time interval, here illustrated as every 3 hours. After the predetermined time interval, the consumption meter will automatically transmit a new data frame with the updated consumed quantity data.

In the illustrated example, the transmission of a data frame DF has a duration of 100 ms, and after a predetermined delay, here 200 ms, a time window TW of a limited length, here 50 ms, is open for receipt of an acknowledge frame. The time window TW is limited so as to reduce electric power needed to keep the communication unit of the consumption meter in a listening mode. If no acknowledgment frame is received by the consumption meter within the limited time window TW, the consumption meter may regard the data frame as lost, either due to a too poor link margin in the transmission, or due to data collision. Of course, the delay and length of the listening time window TW are preferably selected so as to match the data frame receipt and acknowledge frame transmission of the associated collector. Especially, data frame length (may be a one or the transmission parameters which can be adjusted according to the invention, e.g. via adjusting data rate, and/or coding rate.

The data frame DF preferably comprises data indicative of the consumed quantity corresponding to the time of transmission of the data frame, e.g. in the form of a value indicative of an accumulated consumed quantity. The data frame DF preferably also includes a unique identification of the consumption meter transmitting the data frame DF, however the data frame DF may comprise additional data indicative of further parameters measured by the consumption meter and/or data indicative of a status of the consumption meter.

As an alternative the data frame DF does not carry any data indicative of a consumed quantity. This might be beneficial for meters, which transmit consumption data with a very long interval, while it is still desirable to enable communication between meter and collector with a shorter interval. In such a case the meter may initiate a communication session with the collector by sending a data frame without consumption related data. This will enable the collector to establish a communication session by transmitting an acknowledge frame in the listening time window TW. Data frames might in other cases carry data unrelated to the consumption as such, this other data could be data related to maintenance of the AMI network or upload of new firmware to the meter or communication unit. A data frame may further comprise commands to be executed by the receiver of the data frame or responses to requests executed by the sender of the frame. A data frame shall thus not be construed as limited to a frame carrying consumption data. Data frames might in some cases be sent with a constant transmission interval while in other cases the transmission of a data frame is initiated due to events occurring in the meter.

An acknowledge frame may be sent in response to any frame received by the collector or the meter. The acknowledge frame may further comprise data besides the acknowledge information. In this case the acknowledge frame may be construed as a data frame which in addition to carry data also is an acknowledge of a previous data frame. Thus, link data may be piggybacked to any frame and any frame containing link data may be used as basis for adjusting the link margin.

The time window TW for reception of an acknowledge frame may be extended by the receiver to be long enough to receive an acknowledge frame including additional data. The receiver may do so by interpreting a length filed in the acknowledge frame, monitor the power in the radio channel or simply by keeping the receiver open long enough for receiving the maximum frame length.

The collector ability to communicate with the meter and the meter ability to adjust transmission parameters to influence the link margin is dependent on the reception of a data frame from the meter. If the transmission parameters is adjusted so that the link margin has been reduced too much, if path loss has increased, or if the noise floor in the collector has raised, reception of frames from the meter is not possible. In this situation, the collector will not transmit an acknowledgement request and thereby cannot request the meter to increase the link margin.

A second algorithm in the meter is preferred, i.e. a fall back algorithm, which allows the meter to automatically adjust transmission parameters so as to increase the link margin without any input from the collector. The meter is preferably arranged to count a number of consecutive missing acknowledge frames from the collector, and the fall back algorithm is then designed to adjust the transmission parameter to increase the link margin based on the number of missing acknowledge frames from the collector. Missing acknowledge frames will occur in the network due to collisions of data frames in the network, and this is preferably not be misinterpreted as a too low link margin. If the meter is too aggressive in raising the link margin, congestion in the system will increase causing additional collisions causing more meters to increase link budget resulting in an unstable system. To avoid such instability, the probability that the collector successfully controls the link margin should be larger than the probability that the meter increases link margin due to collisions:

$$1-SER^N > SER^N$$

$$SER^N < 0,5$$

Here N is the number of consecutive missing acknowledgement frames before the meter automatically adjusts its transmission parameters in order to increase the link margin. SER is the Sequence Error Rate, i.e. probability sequence of transmitting a data frame from meter to collector and receiving the acknowledge in the meter fails, $$SER = 1 - (1 - PER_{Collisions,MTC})(1 - PER_{Collisions,CTM})$$

Probability of faulty increase of link budget due to collisions = $SER^N$

Probability of successful regulating the link margin = $1 - SER^N$ $PER_{Collisions,MTC}$: Packet Error Rate in the link Meter To Collector $PER_{Collisions,CTM}$: Packet Error Rate in the link Collector To Meter.

It is to be understood that the selection of N in the fall back algorithm may vary depending on the system, however it has been found that selection of N in the interval 4-10 can be a good match. However, such preferred N value may be highly dependent on maximum SER of the system.

In some embodiments it may be beneficial if the fall back algorithm gradually increases the link margin in a number of small steps. Increasing link margin rapidly to the maximum when the number of consecutive missing acknowledge frames has reached a threshold value may lead to unnecessary congestion in the network and an increased energy consumption in the meter. Thus the fall back algorithm gradually increases the link margin in a number of steps when the threshold value is reached. The fall back algorithm increases link margin one step each time the number of consecutive missing acknowledge frames increases. The fall back algorithm has to compensate for changes in path loss due to changes in the environment surrounding the meter. Such changes in the environment could be a meter pit that is flooded with water or a truck that is parked in front of a meter. Such changes typically causes changes in path loss in the range 3-10 dB. Thus the size of the steps used by the fall back algorithm for increasing the link margin may preferably be in the same range from 3-10 dB.

When the fall back algorithm increases the link budget each step may comprise adjusting one or more communication parameters. Communication parameters such as transmission power, coding rate or spreading factor are typically used to adjust the link margin. The following steps are examples of steps for increasing the link margin by the fall back algorithm: Step1 (Increase transmission power 6 dB), Step2 (Increase transmission power 3 dB and increase coding rate 1 step), Step3 (Increase coding rate 2 steps) Step 4 (increase to maximum transmission power and coding rate). The steps may cause different changes in link margin.

In some embodiments, the collector is also arranged to adjust its transmission parameter for transmission of the acknowledge frame to the meter. For this, the meter will in all or at least some data frame transmissions include link data to the collector about the link margin estimated while receiving an acknowledge frame after the previous interval frame. The collector can use this information to adjust the link margin of the next acknowledge frame. This can be used to reduce network congestion problems, since transmission parameters can be selected to just obtain an acceptable link margin without unnecessary disturbance of the network.

If the collector does not have any power constraints a target link margin in the direction collector to meter that is higher than the target link margin meter to collector can be beneficial.

The link data, either from the meter to the collector or the opposite way, is preferably piggybacked onto already existing frames to be sent. Thus, link data from the collector to the meter is preferably piggybacked onto the acknowledgement frames, and link data from the meter to the collector is preferably piggybacked onto data frames with data indicative of the consumed quantity. However, link data may be piggybacked to any type of frame by any device. Link data may include data indicative of a measured link margin or any data indicative of a change in communication parameters e.g. a desired link margin or instructions or commands informing the meter about new communication parameters to be used for the following transmissions in order to change the link margin.

Other link data may be piggybacked in transmitted frames. Such data may be data related to the set of transmission parameters used for transmission of the frame. These parameters include transmission power, coding rate, type of antenna or antenna gain or other antenna conditions. Transmitting the used communication parameters within the frame has the advantageous of enabling the receiver to calculate the path loss in the radio channel.

Figure 3:
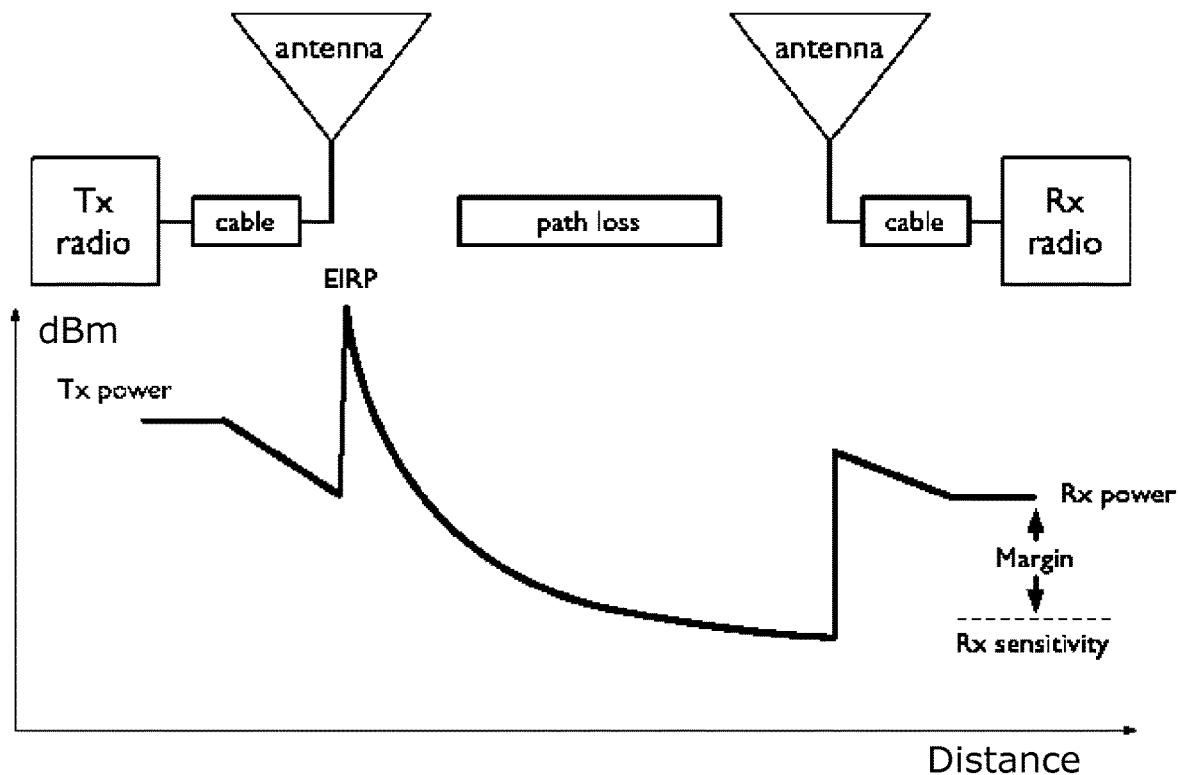
FIG. 3 illustrates the principle of link margin which may be determined by a collector in response to receipt of a data frame from a consumption meter.

FIG. 3 shows a sketch for illustration of link margin between a radio transmitter Tx radio, e.g. in a consumption meter, and a radio receiver Rx radio, e.g. in a collector. Here the link margin $$\text{LinkMargin [dB]} = P_{Meter} + AG_{Meter} + PL + AG_{Collector} - RS_{Collector} + CG_{Collector}$$

Where P=Output power [dBm], AG=Antenna gain [dB], PL=Path loss [dB], RS=Receiver sensitivity [dBm], and CG=Coding gain [dB] (gain from spreading and/or coding).

It is to be understood that link data can be provided in many different forms other than a value indicative of the link margin with the above definition.

A specific meter and collector communication scheme has the following properties.

An AMI system in which the collector dynamically optimizes the link margin by sending link management control commands to the meter. The link management control commands controls the transmission power, data rate, coding rate, channel, spreading factor etc. of the meter, An AMI system in which the collector is able to dynamically control the transmission power, data rate, coding rate, channel, spreading factor etc. of the meter in order to optimize the link margin by piggybacking control information in other frames.

An AMI system in which the collector has the responsibility to dynamically optimizes the link margin in order to mitigate the dynamics in noise floor, path loss etc.

An AMI system in which the collector dynamically controls the transmission power, data rate, coding rate, channel, spreading factor etc. of the meter in order to optimize the link margin by sending link management control information to the meter. And where the control information is protected by cryptographic methods.

An AMI system in which the collector receives a lifetime limited cryptographic key that enables the collector to dynamically control the transmission power, data rate, coding rate, channel, spreading factor etc. of the meter in order to optimize the link margin.

An AMI system in which the meter has a fall back algorithm that automatically increases link margin.

An AMI system in which the meter has a fall back algorithm that automatically increases link margin based on missing reception of Acknowledge frames.

An AMI system in which the meter has a fall back algorithm that automatically gradually increases link margin based on missing reception of acknowledgement frames.

An AMI system in which the meter has a fall back algorithm that automatically increases link margin based on the number of missing Acknowledge frames (N). Where N is selected so that SERN<0.5

An AMI system in which the collector adjust the link margin in direction collector to meter based on information regarding link margin estimated by the meter.

Figure 4:
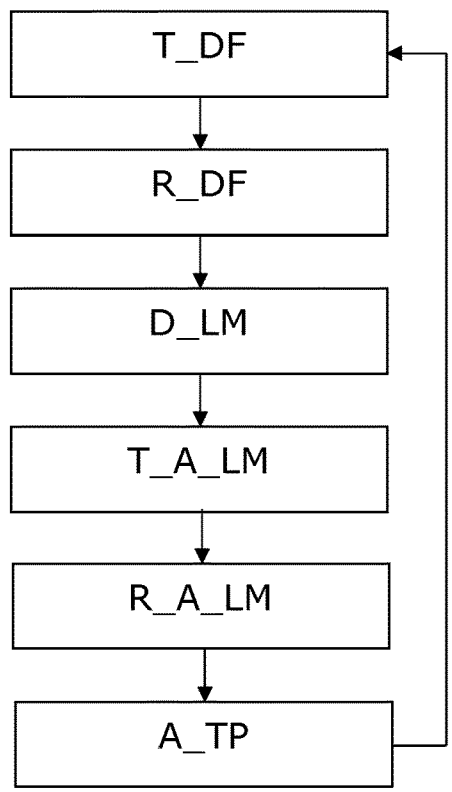
FIG. 4 illustrates steps of a method embodiment.

FIG. 4 illustrates method steps of a method embodiment for remote reading of a consumption meter via a connection less network. The method comprises transmitting T_DF a data frame comprising data indicative of a consumed quantity in accordance with a set of transmission parameters. In response to the transmitted data frame, a collector receives R_DF the data frame comprising data indicative of a consumed quantity. The collector then determines D_LM a measure of link margin, for receipt of the data frame, and the collector transmits T_A_LD an acknowledgement frame comprising link data in response to the measure of link margin, e.g. link data in the form of a set of transmission parameters to be used by the subsequent data frame transmissions so as to obtain a link margin within an acceptable predetermined range. The consumption meter then receives R_A_LD, within a limited time window, the acknowledgement frame comprising the link data from the collector. In response, the consumption meter adjusts A_TP the set of transmission parameters according to the link data from the collector. Especially, the link data may be indicative of the adjustments of the set of transmission parameters, however alternatively, the link data may comprise data indicative of the determined link margin by the collector, e.g. in the form of a dB value, and the consumption meter may then execute an adjustment algorithm to calculates e.g. an adjusted transmission power accordingly to be used for transmission of the subsequent data frame. The arrow from the A_TP step back to the data frame transmission step T_DF indicates that the algorithm is as an automatic sequence of steps that repeats itself with a predetermined time interval, e.g. 3 hours, wherein a data frame with updated data indicative of a consumed quantity is transmitted.

The link data transmitted by the collector may instruct the meter to change to an alternative channel for transmission.

Change of transmission channel is in this regard to be understood as changing the centre frequency of the radio channel in which the data frames are transmitted. This may have the advantageous effect that the transmission of data frames is moved to a radio channel with less noise from third party users or other sources of disturbance. Further, the selection of an alternative radio channel may allow for the use of alternative communication parameters. These alternative communication parameters may improve the link margin or as an alternative reduce the transmission duration while also reducing the link margin.

The meter may as well use the link data to indicate the channel in which the listening time window TW will be opened. This has the advantage that the meter can select an alternative channel with less interference or in which a better link margin is achievable.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. A consumption meter arranged to determine a consumed quantity of a utility at the consumer site, comprising:
   a communication unit comprising a transmitter and a receiver arranged for communication via a network, and being arranged:
      to autonomously transmit data frames in accordance with a set of transmission parameters,
      to receive, within a time window following transmission of said data frame (DF), an acknowledgement frame comprising link data indicative of receipt of said data frame by an associated collector, and
      to adjust the set of transmission parameters for transmission of a subsequent data frame in response to said link data; and
   in case no acknowledgement frame is received within said time window, increase link margin according to a fall back algorithm being arranged:
      to count a number of consecutive missing acknowledgement frames in response to transmission of consecutive data frames, wherein the number of consecutive missing acknowledgement frames is a number of consecutive time windows in which no data frame is received, and
      if the number of consecutive missing acknowledgement frames exceeds a predetermined threshold value, to determine an adjusted set of transmission parameters in response to the number of consecutive missing acknowledgement frames (N),
      wherein the predetermined threshold value of the number of consecutive missing acknowledgement frames is selected to ensure that a probability of the associated collector successfully regulating the link margin is greater than a probability of increasing the link margin due to the collisions.

2. The consumption meter according to claim 1, wherein in the fall back algorithm increases the link margin gradually in a number of steps, each step including adjusting either one or both of a transmission power or a coding rate.

3. The consumption meter according to claim 1, wherein the communication unit is arranged to adjust the set of transmission parameters in response to the link data, and wherein such transmission parameters include one or more of: transmission power, data rate, coding rate, transmission channel, or transmission spreading factor.

4. The consumption meter according to claim 1, being arranged to adjust the set of transmission parameters in accordance with an adjustment algorithm in response to the link data.

5. The consumption meter according to claim 4, wherein the link data comprises a measure of link margin determined by an associated collector, and wherein the adjustment algorithm determines an adjusted set of transmission parameters, so as to obtain a lower link margin in transmission of subsequent data frames, in case a value of the measure of link margin is above a predetermined threshold value.

6. The consumption meter according to claim 1, wherein the communication unit is arranged to determine a measure of link margin for receipt of the acknowledgement frame, and to transmit link data indicative of said measure of link margin.

7. The consumption meter according to claim 6, wherein the communication unit is arranged to transmit said link data piggybacked onto a data frame comprising data indicative of the consumed quantity of the utility.

8. The consumption meter according to claim 6, wherein the data frame comprises data indicative of the consumed quantity of the utility.

9. The consumption meter according to claim 8, wherein the consumption meter is arranged to transmit a data frame comprising data indicative of the consumed quantity of the utility at a predetermined time interval.

10. A system for remote reading of a plurality of consumption meters via a network, the system comprising:
    a plurality of consumption meters according to claim 1;
    a plurality of collectors arranged at respective locations, each collector comprising a communication unit having a transmitter and a receiver arranged for communication via a network, and being arranged
       to receive data frames comprising data indicative of a consumed quantity from a plurality of consumption meters,
       to determine a measure of link margin, for receipt of a data frame from a consumption meter, and
       to transmit an acknowledgement frame to the consumption meter comprising link data in response to the measure of link margin; and
    a computer arranged for communication with the plurality of collectors and being arranged to receive data indicative of the consumed quantity from said plurality of consumption meters collected by the plurality of collectors.

11. A method for remote reading of a consumption meter via a network, the method comprising:
    transmitting from the consumption meter a data frame comprising data indicative of a consumed quantity of a utility in accordance with a set of transmission parameters,
    receiving at a collector the data frame comprising data indicative of the consumed quantity of the utility,
    determining by the collector a measure of link margin for receipt of said data frame, and
    transmitting from the collector to the consumption meter an acknowledgement frame comprising link data in response to the measure of link margin,
    receiving at the consumption meter, within a time window, the acknowledgement frame comprising link data, and adjusting at the consumption meter, the set of transmission parameters for transmission of a subsequent data frame in response to:
  in the case that an acknowledgement frame was received, said link data, or
  in the case that no acknowledgement frame was received, a fall back algorithm,
  wherein the fall back algorithm is arranged:
    to count a number of consecutive missing acknowledgement frames in response to transmission of consecutive data frames, wherein the number of consecutive missing acknowledgement frames is a number of consecutive time windows in which no data frame is received, and
    if the number of consecutive missing acknowledgment frames exceeds a predetermined threshold value, to determine an adjusted set of transmission parameters in response to the number of consecutive missing acknowledgement frames (N),
    wherein the predetermined threshold value of the number of consecutive missing acknowledgement frames is selected to ensure that a probability of the associated collector successfully regulating the link margin is greater than a probability of increasing the link margin due to the collisions.

12. The method according to claim 11 further comprising increasing the link margin gradually in a number of steps using the fall back algorithm, each step including adjusting either one or both of a transmission power or a coding rate.

13. The method according to claim 11 further comprising arranging the communication unit to adjust the set of transmission parameters in response to the link data, wherein the transmission parameters include one or more of: transmission power, data rate, coding rate, transmission channel, or transmission spreading factor.

14. The method according to claim 11 further comprising adjusting the set of transmission parameters in accordance with an adjustment algorithm in response to the link data.

15. The method according to claim 14 further comprising determining a measure of link margin of the link data by an associated collector, wherein the adjustment algorithm determines an adjusted set of transmission parameters, so as to obtain a lower link margin in transmission of subsequent data frames, in case a value of the measure of link margin is above a predetermined threshold value.

16. The method according to claim 11 further comprising:
  determining a measure of link margin for receipt of the acknowledgement frame, and
  transmitting link data indicative of said measure of link margin.

17. The method according to claim 16 further comprising transmitting said link data piggybacked onto a data frame comprising data indicative of the consumed quantity of the utility.

18. The method according to 16 further comprising transmitting a data frame comprising data indicative of the consumed quantity of the utility at a predetermined time interval.

19. The method according to claim 11 further comprising:
  providing a plurality of consumption meters,
  arranging a plurality of collectors at respective locations, and
  remote reading the plurality of consumption meters via the network.

20. The consumption meter according to claim 19, wherein the predetermined threshold value of the number of consecutive missing acknowledgement frames is in a range from 4 to 10.

* * * * *